(12) United States Patent
Uhler

(10) Patent No.: US 7,760,113 B2
(45) Date of Patent: Jul. 20, 2010

(54) APPARATUS FOR ASSISTING A PARKING-SPACE ENTRY OPERATION OF A VEHICLE

(75) Inventor: Werner Uhler, Bruchsal (DE)

(73) Assignee: Robert Bosch GmbH, Stuttgart (DE)

( * ) Notice: Subject to any disclaimer, the term of this patent is extended or adjusted under 35 U.S.C. 154(b) by 520 days.

(21) Appl. No.: 11/578,439

(22) PCT Filed: Mar. 4, 2005

(86) PCT No.: PCT/EP2005/050990

§ 371 (c)(1),
(2), (4) Date: Oct. 13, 2006

(87) PCT Pub. No.: WO2005/100135

PCT Pub. Date: Oct. 27, 2005

(65) Prior Publication Data

US 2008/0094252 A1    Apr. 24, 2008

(30) Foreign Application Priority Data

Apr. 15, 2004    (DE) .................... 10 2004 018 205

(51) Int. Cl.
*B60Q 1/48*    (2006.01)
(52) U.S. Cl. .................. 340/932.2; 340/425.5; 340/436; 701/207; 701/301; 701/216
(58) Field of Classification Search ............. 340/932.2, 340/901–903, 933, 425.5, 436; 414/233–234, 414/261, 263, 227, 264; 701/207, 214, 216, 701/301, 1, 70
See application file for complete search history.

(56) References Cited

U.S. PATENT DOCUMENTS

| | | | | |
|---|---|---|---|---|
| 3,669,200 A | * | 6/1972 | Odell | 180/204 |
| 5,646,614 A | * | 7/1997 | Abersfelder et al. | 340/932.2 |
| 6,411,867 B1 | * | 6/2002 | Sakiyama et al. | 701/1 |
| 6,476,730 B2 | * | 11/2002 | Kakinami et al. | 340/932.2 |
| 6,567,726 B2 | * | 5/2003 | Sakiyama et al. | 701/1 |
| 7,024,286 B2 | * | 4/2006 | Kimura et al. | 701/1 |
| 2002/0175832 A1 | | 11/2002 | Mizusawa et al. | |
| 2006/0099067 A1 | * | 5/2006 | Wigerud | 414/809 |

FOREIGN PATENT DOCUMENTS

| | | |
|---|---|---|
| DE | 102 50 021 | 5/2004 |
| EP | 1 123 844 | 8/2001 |
| EP | 1403138 * | 3/2004 |
| JP | 2001334898 | 12/2001 |

* cited by examiner

*Primary Examiner*—Daniel Previl
(74) *Attorney, Agent, or Firm*—Kenyon & Kenyon LLP

(57) ABSTRACT

The invention relates to an apparatus for assisting a parking-space entry operation of a vehicle, comprising a back-up camera for acquiring a back-up image reproducing the space behind the vehicle, and comprising a screen for displaying the back-up image, a decision mark for a first steering input of the parking-space entry operation, which mark is to be brought into coincidence with at least a part of a boundary of a parking space, being depictable on the screen in superimposition with the back-up image. To assist entry into tight parking spaces, it is proposed that multiple decision marks for the first steering input be depictable simultaneously on the screen, which marks correspond respectively to a different minimum number of turns to be performed for the parking-space entry operation.

20 Claims, 6 Drawing Sheets

APPARATUS FOR ASSISTING A PARKING-SPACE ENTRY OPERATION OF A VEHICLE

FIELD OF THE INVENTION

The invention relates to an apparatus for assisting a parking-space entry operation of a vehicle, having a back-up camera for acquiring a back-up image reproducing the space behind the vehicle, and having a screen for displaying the back-up image, a decision mark for a first steering input of the parking-space entry operation, which mark is to be brought into coincidence with at least a part of a boundary of a parking space, being depictable on the screen in superimposition with the back-up image.

DESCRIPTION OF RELATED ART

An apparatus of this kind is disclosed, for example, by EP 1 123 844. In this apparatus, the situation at the rear of the vehicle is imaged by way of the camera and is displayed to a driver of the vehicle on the screen. Superimposed on the display are auxiliary lines—e.g. the current driving "track," which indicates the path of the vehicle extrapolated from the instantaneous state—which are intended to help the driver maneuver into the parking space. The apparatus is provided for the purpose of getting into a parking space, disposed perpendicular to the vehicle direction or parallel to the vehicle direction, with a maximum of two turns with no change in the vehicle direction, the vehicle direction being in principle oriented backward. Disadvantageously, this apparatus permits parking-space entry into lateral parking spaces disposed parallel to the vehicle direction with the assistance of the auxiliary lines only as a two-turn parking-space entry. With the aid of the first turn, steering into the parking space takes place; countersteering occurs in the second turn, and the parallel position of the vehicle in the parking space is already achieved during the second turn. A two-turn parking-space entry requires, on principle, a larger parking space than a three- or multiple-turn parking-space entry.

JP 2001334898 furthermore discloses a parking aid device for a vehicle that has a camera at the rear of the vehicle to acquire a rearward view, and a screen disposed in the vicinity of a steering wheel in order to display the rearward view. A starting position for a steering operation is displayed on the screen to allow the vehicle to be parked in a parking area extending approximately perpendicular to the vehicle orientation.

Parking-space entry aid systems operating with the aid of ultrasonic sensors are also known, which systems warn the driver of the vehicle acoustically and/or optically, for example by way of a bar display, about obstacles in the vicinity of the own vehicle.

SUMMARY OF THE INVENTION

It is an object of the invention to provide an apparatus of the kind described above that assists the driver of the vehicle with parking-space entry even into tight parking spaces and with more than two turns.

These and other objects of the invention are achieved in that multiple decision marks for the first steering input are depictable simultaneously on the screen, which marks correspond respectively to a different minimum number of turns to be performed for the parking-space entry operation.

The apparatus according to the present invention, which is suitable in particular for easy entry into lateral parking spaces parallel to the vehicle entering the space, offers assistance even with entry into tight parking spaces, which cannot be achieved with only a two-turn parking operation. In contrast to two-turn parking, in three-turn parking the travel direction of the vehicle is changed after the second turn; in four-turn parking a further change in the direction of travel occurs after the third turn. The apparatus is very reliable and low-maintenance because, in contrast to the devices known from the existing art that have optical and/or acoustic sensors, it does not operate as a measuring system. Complex and error-prone surveying of the parking space is not necessary with the present invention. In particular, the apparatus according to the present invention takes into account the circumstance that during the first turn of the parking-space entry with a vehicle traveling backward, drivers usually do not utilize the full-lock steering input, principally in order to prevent protrusion of the front of the vehicle into oncoming traffic and thus a possible collision. Many two-turn parking-space entry aids known from the existing art, however, absolutely require a full-lock steering input already during the first turn, since otherwise successful completion of the parking-space entry operation can no longer be achieved. The apparatus according to the present invention, on the other hand, assists the driver, and enables him to park the vehicle, even when the first steering input is not to full lock. The invention utilizes, in this context, the fact that for a given vehicle, the correlation between steering angle and vehicle trajectories is defined in each case. This yields respective decision points for the change in steering input as a function of the position of the parking space relative to the vehicle. For visualization of the decision points, the invention provides for graphical elements in the form of decision marks which the driver can easily, by way of the back-up camera, bring into coincidence on the screen with easily visible objects, for example a boundary of the parking space. The decision marks can be depicted permanently at defined points on the screen, or as applicable (for example when the apparatus detects a parking-space entry operation or when selected by the driver) at those predetermined points. The apparatus offers particularly good clarity and is very easy for the driver to operate if, according to an advantageous refinement of the invention, the decision marks are horizontal lines bringable into superimposition with the rear boundary, facing away from the vehicle, of the parking space in the context of a lateral parking-space entry operation. The rear boundary is, for example, a further vehicle already parked behind the open parking area constituting the parking space.

BRIEF DESCRIPTION OF THE DRAWINGS

The invention will be described in greater detail with reference to the following drawings wherein.

DETAILED DESCRIPTION OF THE INVENTION

Figure 1:
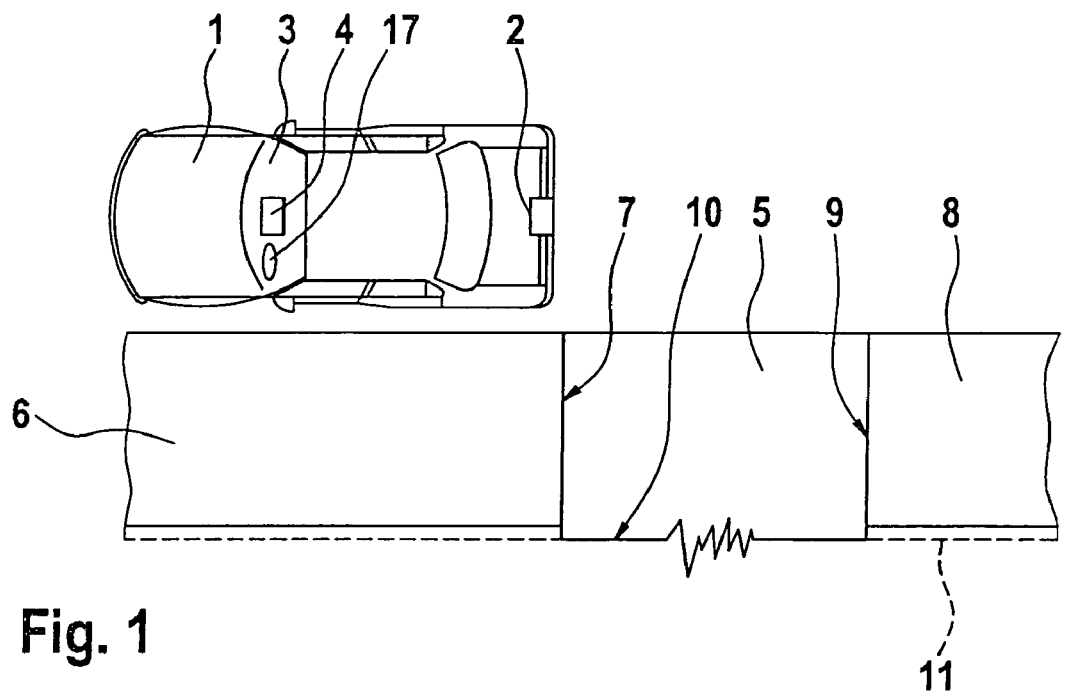
FIG. 1 shows a vehicle and a parking space in plan view.

According to an advantageous refinement of the invention, driving track boundaries indicating a driving track of the vehicle as a function of the steering input are depictable on the screen in superimposition with the back-up image. The driver obtains in this fashion clear, easy-to-read information about the expected path of the vehicle in the instantaneous rearward vehicle surroundings. In the simplest case, the driving track boundaries are two straight lines (with no steering input) or curved lines (with steering input).

It is furthermore helpful in terms of informing the driver about possible further motion of the vehicle in the instantaneous rearward vehicle surroundings if, according to another advantageous refinement of the invention, at least one portion of an arc indicating the minimum turning circle of the vehicle is depictable on the screen in superimposition with the back-up image. The respective outer rear wheel of the vehicle moves, with full-lock steering input, on this turning circle or (in the context of a depiction for a steering input both to the left and the right) circles.

What is essential for a successful parking-space entry operation is above all the beginning and execution of the first steering operation with reference to the parking space to be occupied by the own vehicle. The apparatus according to the present invention offers advantageous assistance for the continuation of the parking-space entry operation if, according to another refinement, a second-decision mark for a second steering input, which mark is to be brought into coincidence with at least a part of a boundary of the parking space, is depictable on the screen in superimposition with the back-up image.

The precision of the parking-space entry operation can advantageously be further enhanced if, according to a refinement of the invention, multiple second-decision marks for the second steering input are depictable on the screen, each mark corresponding to a different minimum number of turns to be executed for the parking-space entry operation. The number of decision marks and of second-decision marks is preferably coincident; for example three decision marks and three second-decision marks are present, for assistance respectively with a two-, three-, and four-turn parking-space entry.

The second-decision marks, like the decision marks described above, can in principle be any graphical elements, for example circles, dots, or triangles. For easy readability of the screen with as little distraction of the driver as possible, however, it is particularly advantageous if, according to a refinement of the invention, at least one of the second-decision marks is a circle segment, or a straight-line portion approximated to the circle segment, that is bringable into coincidence with an inner boundary of the parking space in the context of a lateral parking-space entry operation. The (short) circle segment increases the clarity of the display; the approximated straight-line portion that replaces the circle segment additionally, and advantageously, decreases the computational complexity for the display. The inner parking-space boundary generally corresponds to a curb edge.

According to another advantageous refinement of the invention, at least one of the second-decision marks is a circle segment, or a straight-line portion approximated to the circle segment, intersecting the depiction of the minimum turning circle, in which context a (short) circle segment already enhances clarity, and a straight-line portion replacing the circle segment additionally decreases display complexity. In particular, a second-decision mark corresponding to a two-turn parking-space entry strategy that requires a full-lock steering input upon countersteering as well (i.e. for the second turn) can be, in an advantageously further reduced display, an intersection point or abutment point of the depictions of the minimum turning circles that result respectively for a right and a left steering input.

The clarity of the screen depiction can also be enhanced, according to another advantageous refinement of the invention, by the fact that at least one of the second-decision marks is a circle segment, or (for an advantageous additional reduction in display control complexity) a straight-line portion approximated to the circle segment, that intersects the depiction of a driving track boundary; the approximated straight-line portion preferably replaces the circle segment. In this context, the depiction of a minimum turning circle can, advantageously, be almost entirely dispensed with if the depictions of the minimum turning circles for the right and left steering inputs are reduced respectively to one line segment intersecting a left driving track boundary and one intersecting a right driving track boundary.

According to another advantageous refinement of the invention, the clarity of the screen depiction is further enhanced, and the operability of the apparatus is simplified, if the decision marks and/or the second-decision marks are equipped with numerals corresponding to the respective minimum total number of turns (i.e. including the first turn) to be executed for the parking-space entry operation.

According to another advantageous refinement of the invention, the screen depiction is particularly easy for the driver to comprehend if the screen is a color screen and the decision marks and/or the second-decision marks and/or the driving track boundaries and/or the at least one portion for indication of the minimum turning circle are depictable in respectively different colors.

The information content of the display is advantageously additionally enhanced, according to another refinement of the invention, by the fact that the decision marks and/or the second-decision marks are depictable as a function of the steering input. A dynamic displacement of the decision marks and/or second-decision marks in accordance with the steering angle actually selected by the driver of the vehicle can thereby be accomplished.

According to another advantageous refinement of the invention, at least one of the decision marks and/or at least one of the second-decision marks can be blanked out. The clarity of the display is further enhanced by the fact that, for example, the decision marks and/or second-decision marks that are not necessary in a specific phase of the parking-space entry operation are no longer displayed, either automatically (i.e. by the apparatus for assisting the parking-space entry operation itself), or by selection by the driver.

In all the Figures, corresponding elements are labeled with identical reference characters.

FIG. 1 shows a vehicle 1 that possesses an apparatus for assisting a parking-space entry operation of vehicle 1. The apparatus, which encompasses a back-up camera 2 and a screen 4, disposed in the region of a dashboard 3, on which a back-up image acquired by back-up camera 2 is displayable, allows the driver of vehicle 1 to enter in accurate and precisely fitting fashion into a parking space 5, depicted here only in shortened fashion. The rear end of a parked vehicle 6 constitutes a front boundary 7, and the front end of a further parked vehicle 8 a rear boundary 9, of parking space 5, whose lateral inner boundary 10 is represented by a curb edge 11.

Figure 2:
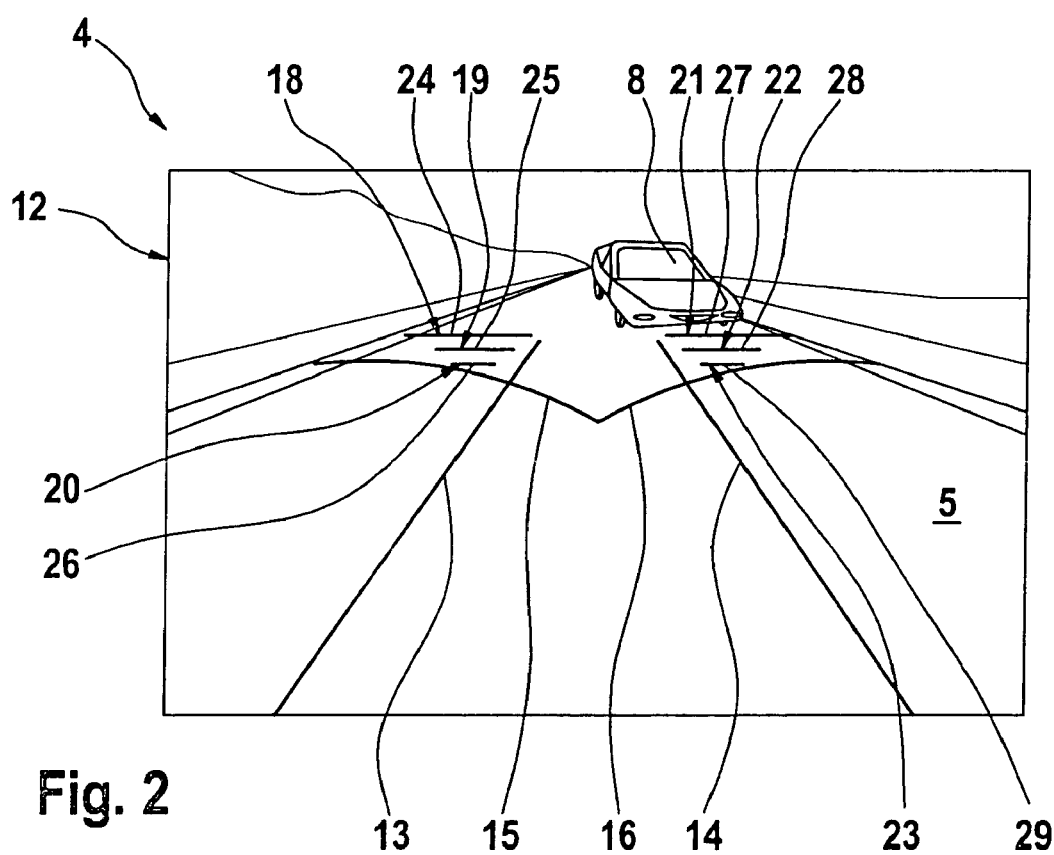
FIGS. 2 through 11 each show a screen with a back-up image and decision marks.
Figure 3:
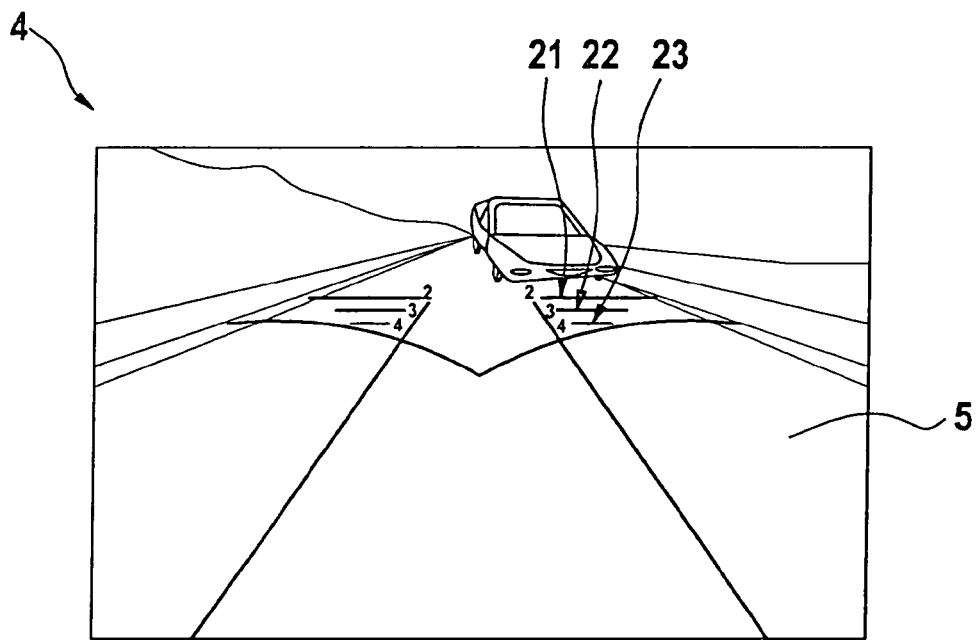

FIGS. 2, 3 depict a screen 4 in a first exemplifying embodiment. Shown on screen 4 is a back-up image 12, reproducing the space behind a vehicle 1 (see FIG. 1), superimposed on which are driving track boundaries 13, 14 that visualize for the driver a driving track of vehicle 1 as a function of the steering input. Also superimposed on back-up image 12 are portions 15, 16 of arcs that indicate the minimum turning circle of vehicle 1 with steering wheel 17 at full lock in the clockwise and counterclockwise direction, respectively. Superimposed on back-up image 12 as a third group of graphical elements are decision marks 18 to 23, embodied as horizontal lines 24 to 29, that respectively correspond to a different minimum number of turns to be executed for the parking-space entry operation. Decision marks 18, 21 located farthest away from vehicle 1 entering the parking space are relevant to two-turn parking entry, decision marks 20, 23 closest to vehicle 1 to four-turn parking entry, and decision marks 19, 22 located therebetween to three-turn parking entry. For an accurately fitting parking-space entry operation, a first steering input to be executed in the direction of parking space 5 must be accomplished when the corresponding decision mark, e.g. line 27 for two-turn entry into parking space 5, is brought into coincidence with rear boundary 9, defined by a parked vehicle 8, of parking space 5.

This situation is depicted in FIGS. 2, 3; in the display on a screen 4 according to FIG. 3, decision marks 21 to 23 relevant to the present case, namely backing into a parking space on the left side of the roadway, are equipped with numerals 2, 3, 4 corresponding to the respective minimum total number of turns that must be executed. Based on his experience and in consideration of the estimated length of parking space 5, before the parking-space entry operation begins the driver makes a decision regarding the parking-space entry strategy to be pursued, i.e. the number of turns (predicted to be) required. For a large parking space 5, the more convenient two-turn parking-space entry can be selected; for smaller parking spaces 5, on the other hand, a three- or four-turn procedure.

Figure 4:
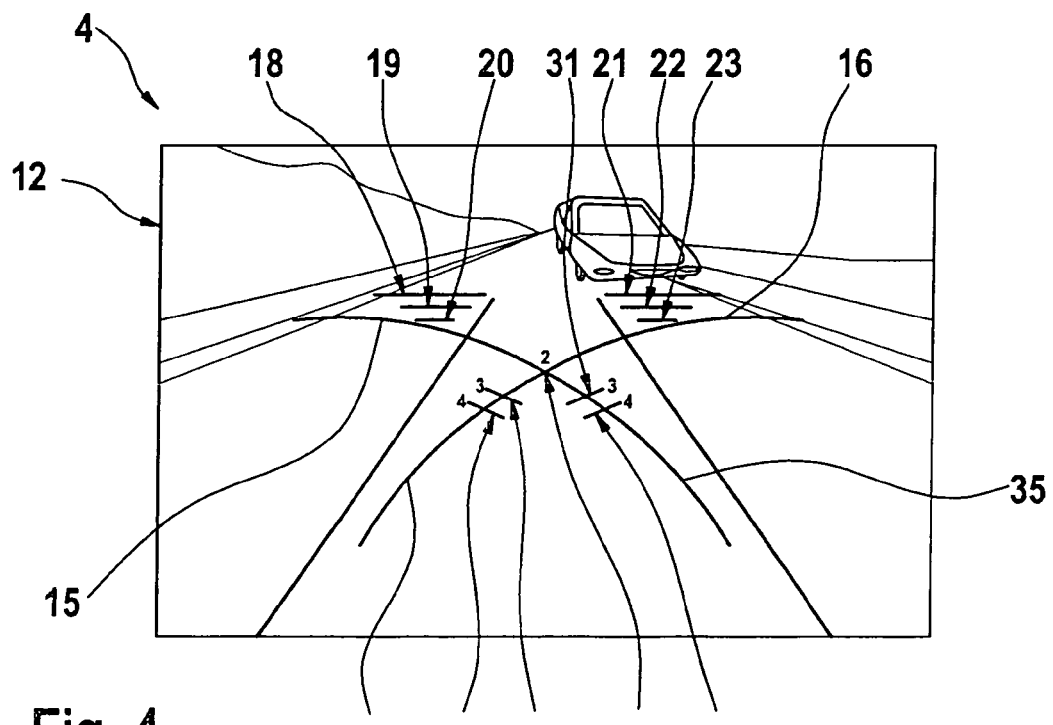
Figure 5:
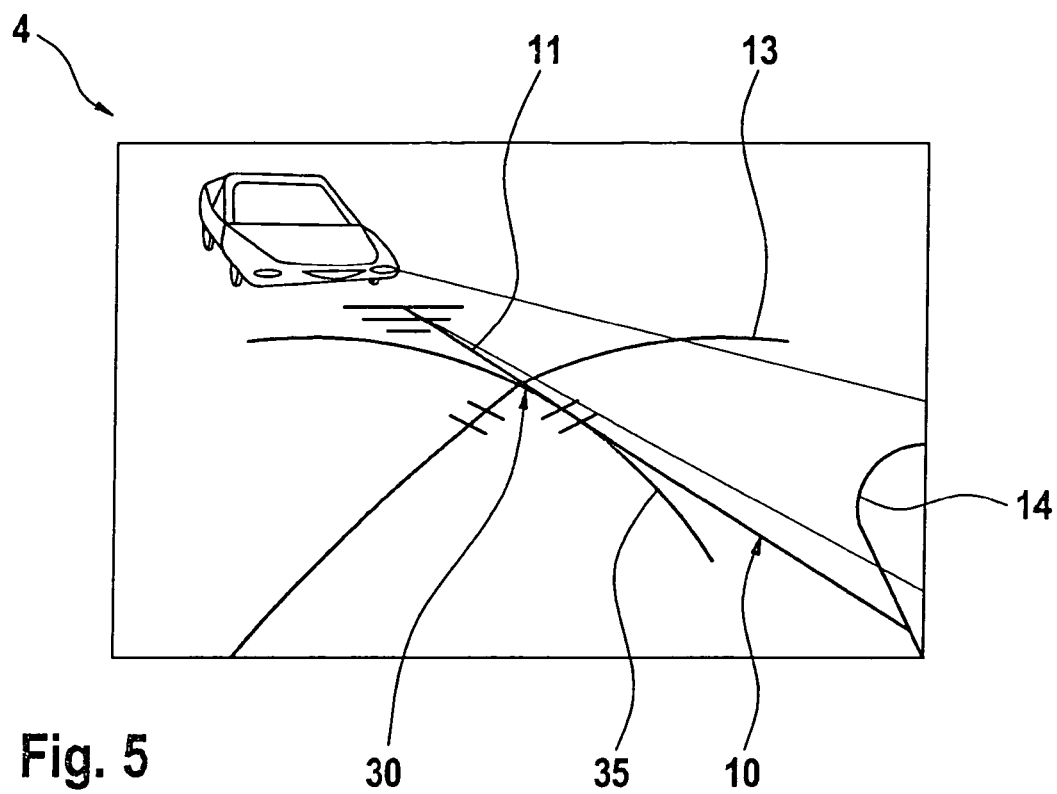
Figure 6:
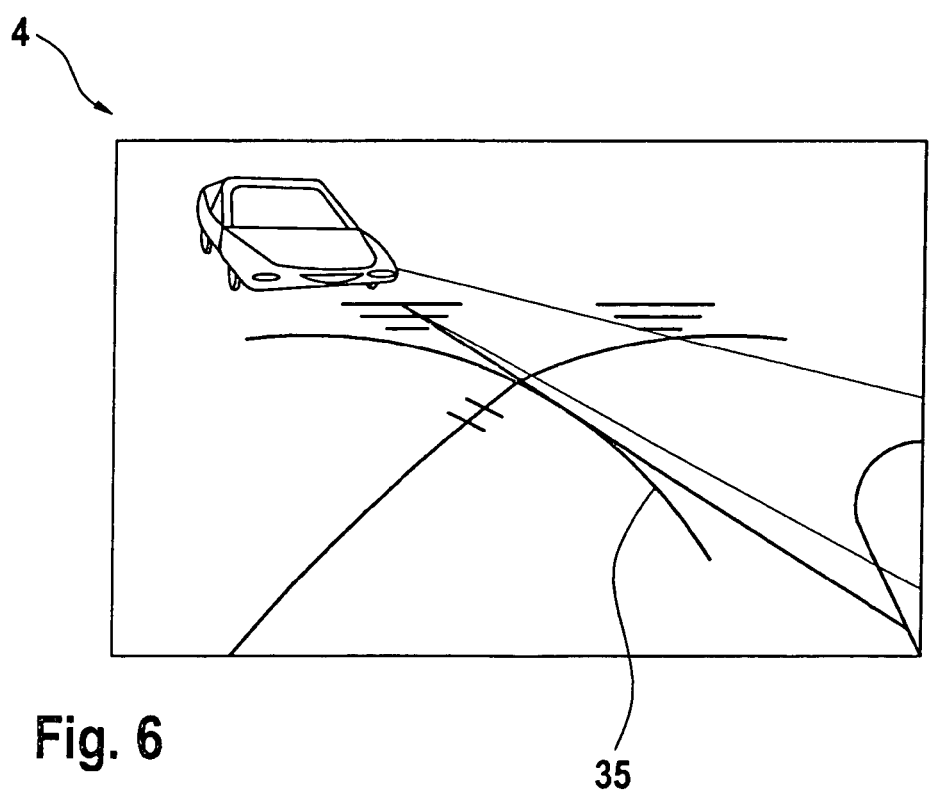

In a second exemplifying embodiment according to FIGS. 4 to 6, as well as decision marks 18 to 23 for a first steering input (corresponding to the exemplifying embodiment according to FIGS. 2, 3), second-decision marks 30 to 34 for a second steering input are additionally superimposed on a back-up image 12 on a screen 4. Second-decision marks 30 to 34 are equipped with numerals 2, 3, 4 corresponding to the respective minimum total number of turns (i.e. including the first turn) to be executed. The additional second-decision marks 31 to 34 for three- and four-turn parking-space entry are displayed at portions 15, 16 of arcs symbolizing the minimum turning circles of vehicle 1 (see FIG. 1). These portions 15, 16 are equipped for that purpose, as compared with the exemplifying embodiment according to FIGS. 2, 3, with extensions 35, 36 toward own vehicle 1; second-decision mark 30 for two-turn parking-space entry is represented by the meeting point of the aforesaid portions 15, 16. The situation in the initial position, i.e. before the first turn and corresponding to the depiction in FIG. 1, is shown in FIG. 4. The display on screen 4 at the reversal point for a two-turn parking entry is depicted in FIG. 5: for accurately fitting parking-space entry the second steering input, which is opposite to the direction of the first steering input, is accomplished when the corresponding second-decision mark 30 comes into coincidence with an inner boundary 10, here a curb edge 11, of parking space 5. If the driver wishes to enter the parking space using three, four, or more turns, he then continues backward with no change in steering angle until the corresponding second-decision mark comes into congruence with curb edge 11; at that point the driver then inputs full steering lock in the opposite direction. He then continues to back up with vehicle 1 until the rear wheel of his vehicle 1 on the inside of the parking space reaches curb edge 11, and then straightens vehicle 1 forward (and, if applicable, then rearward) in parking space 5 with the corresponding further turns.

The longitudinal position of second-decision marks 31 to 35 on portions 15, 16 (or their extensions 35, 36) indicating the minimum turning circles can be adapted—for example with the aid of a control device of the apparatus for assisting the parking-space entry operation and in consideration of the signal of a steering-angle sensor—in accordance with the current steering angle of vehicle 1. The position of second-decision marks 31 to 35 is then not static, but rather is adapted dynamically to current and actual conditions in terms of vehicle dynamics. This takes account of the fact that the smaller the steering angle that was selected by the driver for the previous (in this case the first) turn, the smaller the angles of vehicle 1 with respect to parking space 5 at the respectively relevant reversal point. It is furthermore apparent from FIG. 5 that driving track boundaries 13, 14 symbolizing the driving track of vehicle 1 are depicted as a function of the instantaneous steering angle, and accordingly are imaged, in the situation shown in FIG. 5, as being curved in the direction toward curb edge 11. As shown in FIG. 6 in a modification of the exemplifying embodiment, second-decision marks not needed in the display on screen 4, in this case those on extension 35, can be blanked out. Blanking is accomplished on the basis of an evaluation, by the control device, of the instantaneous steering angle sensed by the steering-angle sensor.

Figure 7:
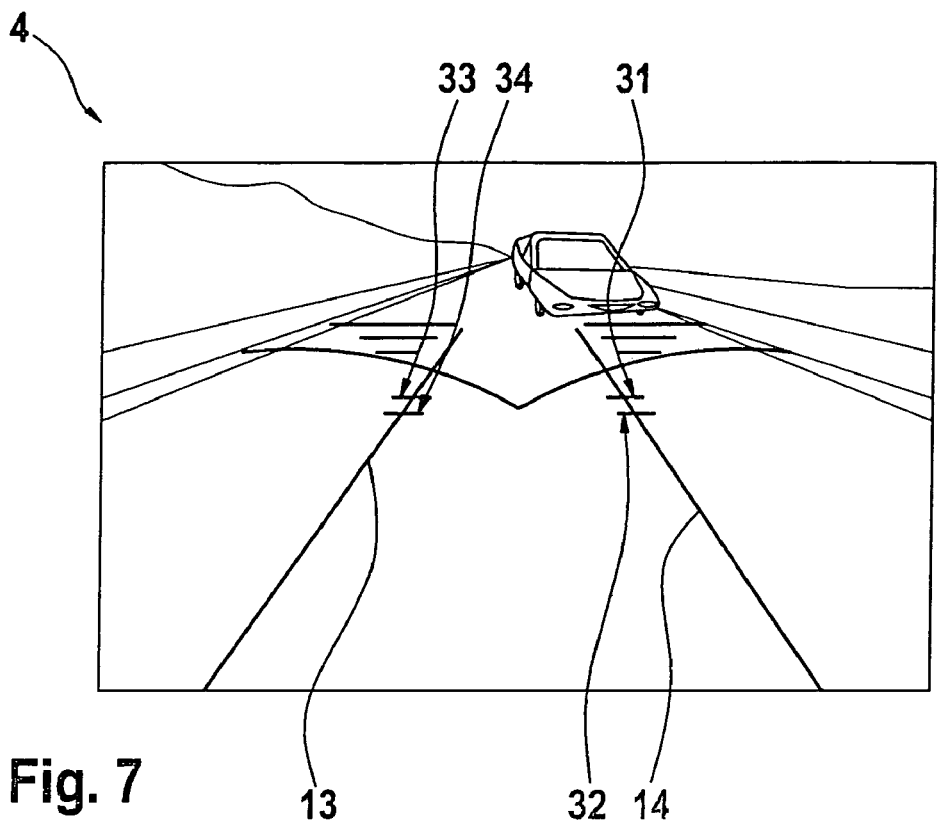
Figure 8:
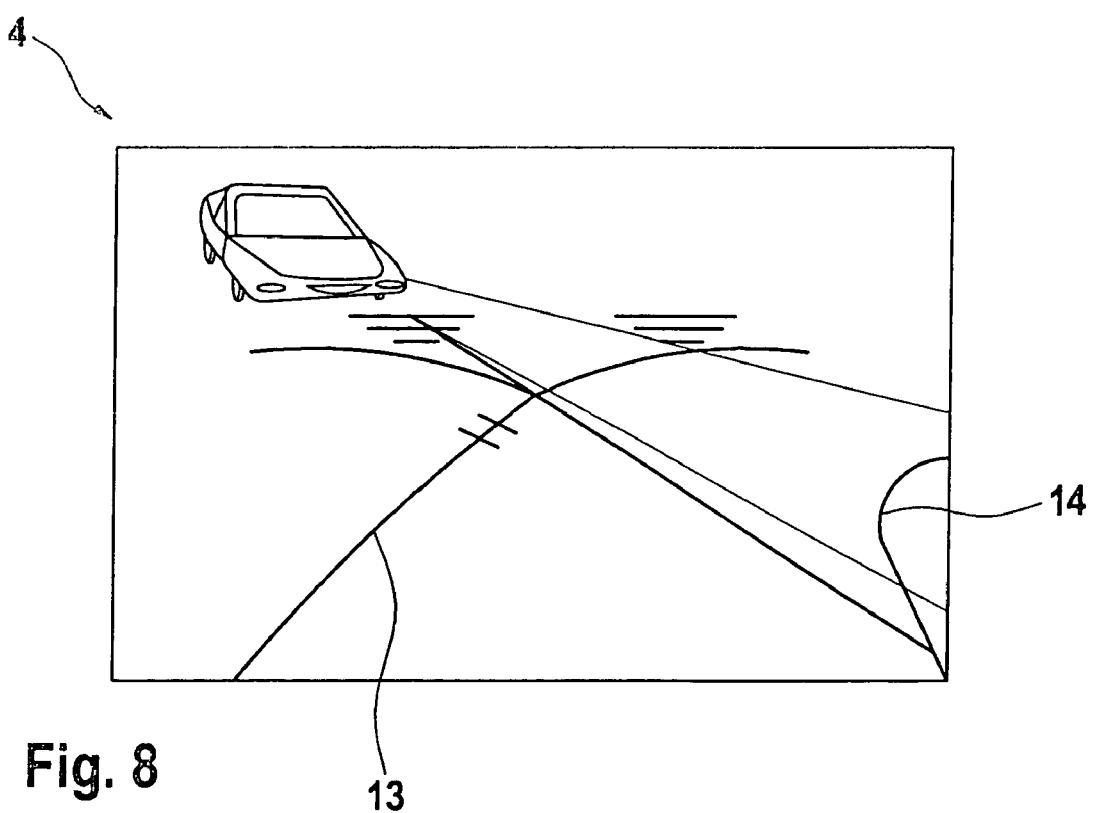

A third exemplifying embodiment is shown by FIGS. 7, 8, in which additional second-decision marks 31 to 34 for three- and four-turn parking-space entry are displayed, on a screen 4, not on depictions of the minimum turning circles but rather on driving track boundaries 13, 14 of the current driving track of vehicle 1 (see FIG. 1). Upon a change in the steering angle, the aforesaid second-decision marks 31 to 34 move along with driving track boundaries 13, 14 in accordance with the latter's displacement. The situation in the initial position, i.e. before the first turn, is shown in FIG. 7; and FIG. 8 reproduces the display on screen 4 at the reversal point for a two-turn parking-space entry. The longitudinal position of second-decision marks 31 to 34 on driving track boundaries 13, 14 can be adapted in accordance with the current steering angle, corresponding to the exemplifying embodiment according to FIGS. 4 to 6. As in the aforesaid exemplifying embodiment, it is also possible to blank out second-decision marks that are not currently required.

Figure 9:
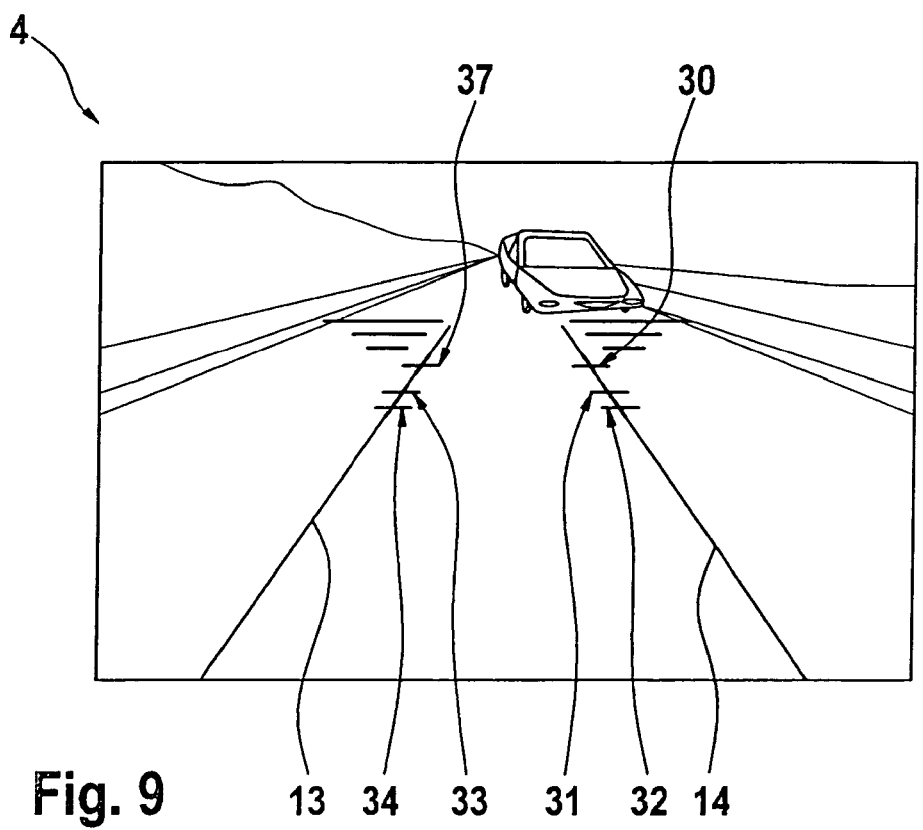
Figure 10:
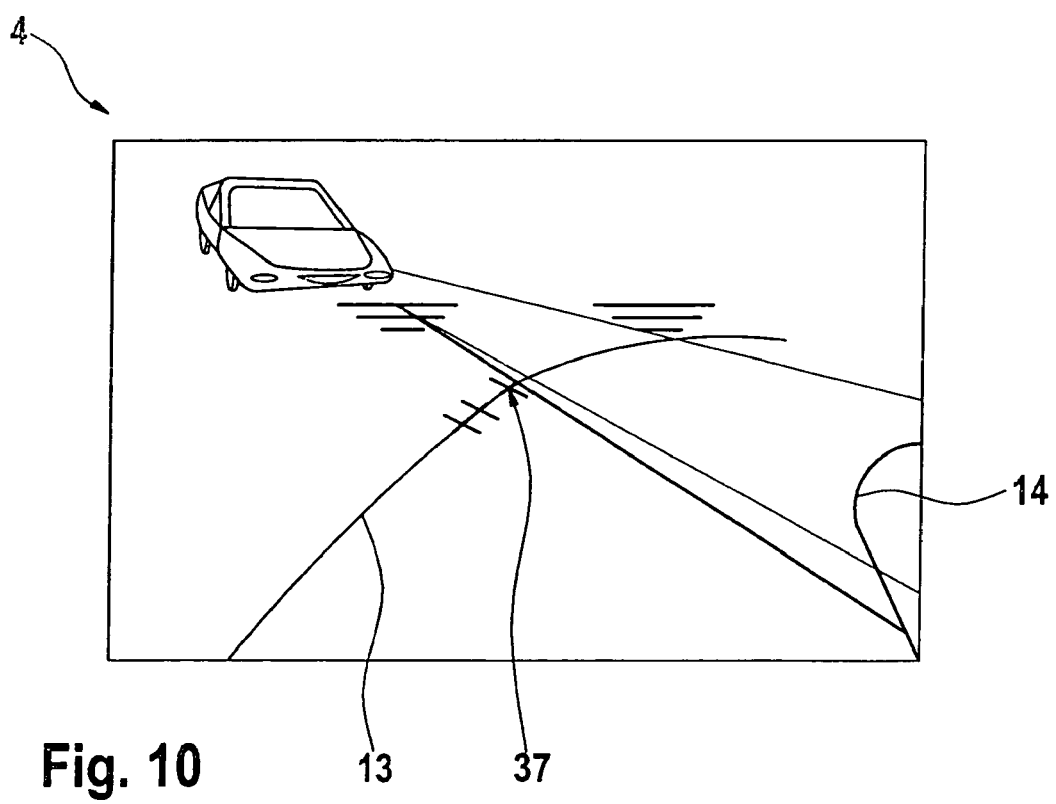
Figure 11:
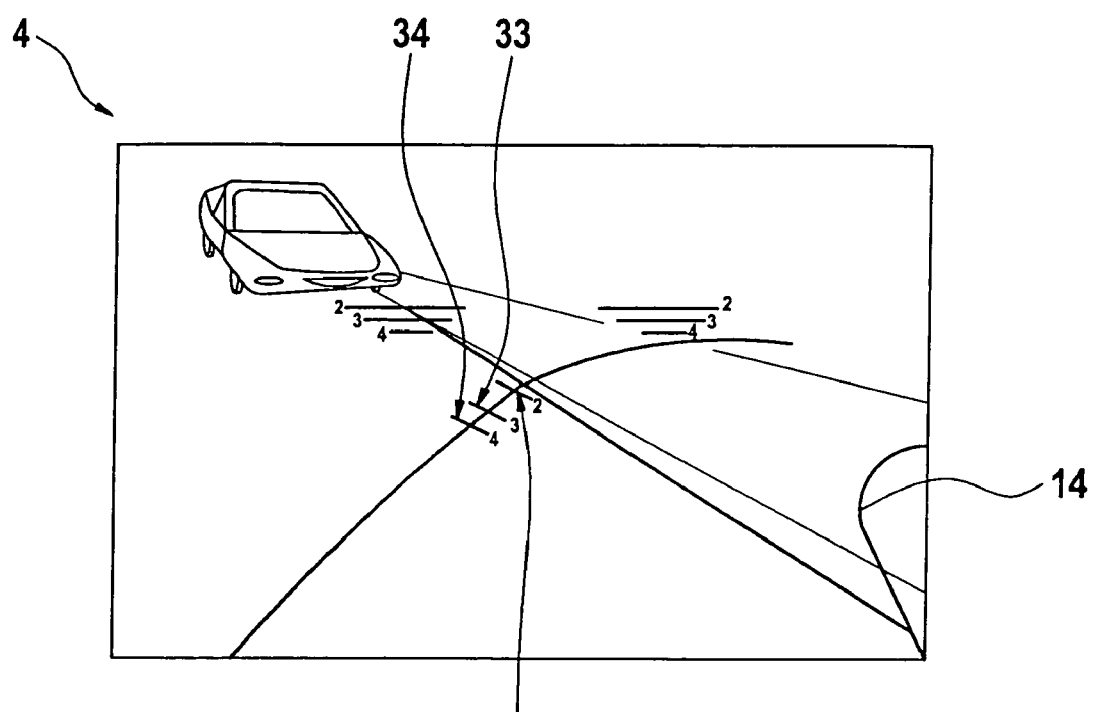

FIGS. 9 to 11 depict a fourth exemplifying embodiment in which, as compared with the previous exemplifying embodiments, a depiction of minimum turning circles is omitted from the display on a screen 4. Instead, a single second-decision mark 30, 37 for the reversal point in the context of two-turn parking-space entry is displayed on each of two driving track boundaries 13, 14, as a supplement to second-decision marks 31 to 34 for the respective reversal points for the second steering input in the context of three- and four-turn parking-space entry. The situation in the initial position, i.e. before the first turn, is shown in FIG. 9; the display on screen 4 at the reversal point in the context of two-turn parking-space entry is depicted in FIG. 10. It is additionally possible—as it is also in all the aforesaid exemplifying embodiments—to provide, not only at the decision marks but also at second-decision marks 30 to 34, 37, references to the pertinent parking strategy, for example the (minimum) number of pertinent turns. This is depicted in FIG. 11, the second-decision marks that are not required here, on driving track boundary 14 on the inner side of the parking space, being blanked out.

What is claimed is:

1. An apparatus for assisting a parking-space entry operation of a vehicle, comprising:
   a back-up camera for acquiring a back-up image reproducing a space behind the vehicle,
   a screen for displaying the back-up image,
   a decision mark for a first steering input of the parking-space entry operation, which mark is to be brought into coincidence with at least a part of a boundary of a parking space, being depictable on the screen in superimposition with the back-up image, wherein multiple decision marks for the first steering input are depictable simultaneously on the screen, which multiple decision marks correspond respectively to different parking-space entry strategies each having a different minimum number of turns to be performed for the parking-space entry operation.

2. The apparatus according to claim 1, wherein the decision marks are horizontal lines bringable into coincidence with the rear boundary, facing away from the vehicle, of the parking space in the context of a lateral parking-space entry operation.

3. The apparatus according to claim 2, wherein at least one portion of an arc indicating the minimum turning circle of the vehicle is depictable on the screen in superimposition with the back-up image.

4. The apparatus according to claim 2, wherein a second-decision mark for a second steering input, which mark is to be brought into coincidence with at least a part of a boundary of the parking space, is depictable on the screen in superimposition with the back-up image.

5. The apparatus according to claim 1, wherein driving track boundaries indicating a driving track of the vehicle as a function of the steering input are depictable on the screen in superimposition with the back-up image.

6. The apparatus according to claim 5, wherein at least one portion of an arc indicating the minimum turning circle of the vehicle is depictable on the screen in superimposition with the back-up image.

7. The apparatus according to claim 6, wherein the screen is a color screen and the driving track boundaries or the at least one portion for indication of the minimum turning circle are depictable in respectively different colors.

8. The apparatus according to claim 5, wherein a second-decision mark for a second steering input, which mark is to be brought into coincidence with at least a part of a boundary of the parking space, is depictable on the screen in superimposition with the back-up image.

9. The apparatus according to claim 1, wherein at least one portion of an arc indicating the minimum turning circle of the vehicle is depictable on the screen in superimposition with the back-up image.

10. The apparatus according to claim 9, wherein a second-decision mark for a second steering input, which mark is to be brought into coincidence with at least a part of a boundary of the parking space, is depictable on the screen in superimposition with the back-up image.

11. The apparatus according to claim 1, wherein a second-decision mark for a second steering input, which mark is to be brought into coincidence with at least a part of a boundary of the parking space, is depictable on the screen in superimposition with the back-up image.

12. The apparatus according to claim 11, wherein multiple second-decision marks for the second steering input are depictable on the screen, each mark corresponding to a different minimum number of turns to be executed for the parking-space entry operation.

13. The apparatus according to claim 11, wherein at least one of the second-decision marks is a circle segment, or a straight-line portion approximated to the circle segment, that is bringable into coincidence with an inner boundary of the parking space in the context of a lateral parking-space entry operation.

14. The apparatus according to claim 11, wherein at least one of the second-decision marks is a circle segment, or a straight-line portion approximated to the circle segment, intersecting the depiction of the minimum turning circle.

15. The apparatus according to claim 11, wherein at least one of the second-decision marks is a circle segment, or a straight-line portion approximated to the circle segment, that intersects the depiction of a driving track boundary.

16. The apparatus according to claim 1, wherein the decision marks are equipped with numerals corresponding to the respective minimum total number of turns to be executed for the parking-space entry operation.

17. The apparatus according to claim 1, wherein the screen is a color screen and the decision marks are depictable in respectively different colors.

18. The apparatus according to claim 1, wherein the decision marks are depictable as a function of the steering input.

19. The apparatus according to claim 1, wherein at least one of the decision marks can be blanked out.

20. A method for assisting a parking-space entry operation of a vehicle, comprising:
   acquiring a back-up image with a back-up camera;
   displaying the back-up image on a display screen; and
   superimposing on the display screen a decision mark for a first steering input of the parking-space entry operation, which mark is to be brought into coincidence with at least a part of a boundary of a parking space, wherein multiple decision marks for the first steering input are depictable simultaneously on the screen, which marks correspond respectively to a different minimum number of turns to be performed for the parking-space entry operation.

* * * * *